United States Patent
Okuyama et al.

(10) Patent No.: US 9,979,448 B2
(45) Date of Patent: May 22, 2018

(54) RADIO COMMUNICATION CONTROL METHOD AND RADIO COMMUNICATION SYSTEM

(71) Applicant: NTT DOCOMO, INC., Tokyo (JP)

(72) Inventors: Tatsuki Okuyama, Tokyo (JP); Satoshi Suyama, Tokyo (JP); Jiyun Shen, Tokyo (JP); Tatsunori Obara, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days. days.

(21) Appl. No.: 15/555,011

(22) PCT Filed: Mar. 2, 2016

(86) PCT No.: PCT/JP2016/056450
§ 371 (c)(1),
(2) Date: Aug. 31, 2017

(87) PCT Pub. No.: WO2016/140276
PCT Pub. Date: Sep. 9, 2016

(65) Prior Publication Data
US 2018/0048363 A1 Feb. 15, 2018

(30) Foreign Application Priority Data
Mar. 5, 2015 (JP) .................. 2015-043823

(51) Int. Cl.
*H04B 7/0452* (2017.01)
*H04B 7/0456* (2017.01)
*H04B 17/336* (2015.01)

(52) U.S. Cl.
CPC ......... *H04B 7/0452* (2013.01); *H04B 7/0456* (2013.01); *H04B 17/336* (2015.01)

(58) Field of Classification Search
CPC .. H04B 7/0617; H04B 7/0456; H04B 7/0413; H04B 7/043; H04B 7/0434; H04B 7/0452
(Continued)

(56) References Cited

U.S. PATENT DOCUMENTS

| 9,795,364 B2 * | 10/2017 | Osumi | A61B 8/5215 |
| 2003/0043929 A1 * | 3/2003 | Sampath | H04B 7/0417 375/267 |

(Continued)

FOREIGN PATENT DOCUMENTS

JP      2013-232741 A      11/2013

OTHER PUBLICATIONS

International Search Report issued in PCT/JP2016/056450 dated Apr. 5, 2016 (2 pages).

(Continued)

*Primary Examiner* — Emmanuel Bayard
(74) *Attorney, Agent, or Firm* — Osha Liang LLP

(57) ABSTRACT

A communication control method includes: for each of plurality of receivers UE, calculating excluding channel matrices that include a plurality of equivalent channel matrices acquired by multiplying a transmit BF weight matrix corresponding to that receiver UE by each of a plurality of channel matrices corresponding to receivers UE other than that receiver UE, acquiring a first eigenvector that is included in a right-singular matrix obtained from single value decomposition of the excluding channel matrices, the first eigenvector corresponding to a noise subspace of the excluding channel matrices, acquiring a second eigenvector that is included in a right-singular matrix obtained from single value decomposition of a product of an equivalent channel matrix including the transmit BF weight matrix corresponding to that receiver UE and the first eigenvector, the second eigenvector corresponding to a signal subspace (Continued)

of the product, and obtaining a precoding matrix corresponding to that receiver UE by multiplying the first eigenvector by the second eigenvector.

7 Claims, 10 Drawing Sheets

(58) Field of Classification Search
USPC .................................. 375/267, 299, 347–349
See application file for complete search history.

(56) References Cited

U.S. PATENT DOCUMENTS

| | | | |
|---|---|---|---|
| 2009/0003416 A1* | 1/2009 | Yu ........................... | H04B 7/068 375/148 |
| 2009/0215399 A1* | 8/2009 | Majonen .............. | H04B 7/0434 455/67.11 |
| 2010/0135203 A1* | 6/2010 | Maru ....................... | H04B 7/04 370/328 |
| 2011/0002237 A1* | 1/2011 | Nakayama ........... | H04B 7/0632 370/252 |
| 2011/0026635 A1* | 2/2011 | Kimura ................ | H04B 7/0417 375/285 |

OTHER PUBLICATIONS

Okuyama, T. et al.; "Perfromance Evaluation of Super High Bit Rate Massive MIMO Transmission using Higher Frequency Bands in Multiuser Environment"; IEICE Technical Report, RCS2014-340, vol. 114, No. 490, Feb. 25, 2015, pp. 231-236 (7 pages).

Suyama, S. et al.; "Influence of Channel Estimation on Massive MIMO with Joint Analog Beamforming and Digital Precoding in High Frequency Bands"; IEICE Technical Report, RCS2014-166, vol. 114, No. 254, Oct. 9, 2014, pp. 51-66 (7 pages).

Obara, T. et al.; "Joint Fixed Beamforming and Eigenmode Precoding for Super High Bit Rate Massive MIMO Systems Using Higher Frequency Bands", Personal, Indoor, and Mobile Radio Communication (PIMRC), 2014 IEEE 25th annual International Symposium on, Sep. 2, 2014, pp. 607-611 (6 pages).

Okuyama, T. et al.; "Performance Evaluation of Hybrid Beamforming Scheme for Multiuser Massive MIMO Transmission in High Frequency Bands", IEICE Technical Report, RC52015-55, vol. 115, No. 113, Jun. 17, 2015, pp. 55-60 (7 pages).

Spencer, Q.H. et al.; "Zero-Forcing Methods for Downlink Spatial Multiplexing in Multiuser MIMO channels", IEEE Transactions on Signal Processing, vol. 52, No. 2, Feb. 2004, pp. 461-471 (11 pages).

* cited by examiner

RADIO COMMUNICATION CONTROL METHOD AND RADIO COMMUNICATION SYSTEM

TECHNICAL FIELD

The present invention pertains to a radio communication control method and to a radio communication system.

BACKGROUND ART

In the field of radio communication, there has been actively employed in recent years MIMO (multiple-input and multiple-output) technology, in which speed and quality of signal transmission are improved by carrying out transmission/reception using a plurality of antennas on the transmitter side and receiver side. MIMO technology includes SU-MIMO (single user MIMO) for a single user (receiver), and MU-MIMO (multiple user MIMO) for a plurality of users (receivers).

Further, there is considered (for example, Patent Document 1) the use of a massive-MIMO transmission scheme that uses a large number of antenna elements (for example, 100 elements or more) so as to achieve a further increase in speed and a reduction in interference in signal transmission in a high-frequency band (for example, 10 GHz or higher), which also enables miniaturization of antennas and in which a wide bandwidth can be attained.

With massive-MIMO, there can be achieved advanced beamforming (BF) by use of a large number of antenna elements, compared to conventional MIMOs. Beamforming is a technology for controlling a directionality and shape of beams (for example, transmission beams corresponding to transmission antennas, reception beams corresponding to reception antennas) by controlling a plurality of antenna elements. With MIMO, phase and amplitude can be controlled for each antenna element, thus the larger the number of antenna elements used, the greater the degree of freedom of beam control.

As one mode of beamforming, fixed beamforming is exemplified. In fixed beamforming, a beamforming weight (fixed beam) to be used is selected from among a plurality of beamforming weights prepared in advance. In fixed beamforming, beamforming that controls fixed beams and coding that achieves compensation for multiplexing between a plurality of streams (transmission-side precoding and reception-side postcoding) are carried out separately.

RELATED ART DOCUMENT

Patent Document

Patent Document 1: Japanese Patent Application Laid-Open Publication No. 2013-232741

SUMMARY OF THE INVENTION

Problem to be Solved by the Invention

In MU-MIMO, a technology is proposed in which interference to other users (receivers) is reduced by block-diagonalizing a channel matrix, which indicates propagation characteristics between a transmitter and a plurality of receivers (Q. H. Spencer, A. L. Swindlehurst, and M. Haartd, "Zero-Forcing Methods for Downlink Spatial Multiplexing in Multiuser MIMO channels," IEEE Trans. Sig. Processing, vol. 53, no. 2, pp. 461-471, February 2004.). In the above technology, the transmitter generates a weight matrix (precoding matrix) with which a channel matrix is to be block-diagonalized by using information about a propagation channel acquired from the plurality of receivers, and uses the weight matrix for transmission of radio signals.

However, the above-stated technology is not compatible with MU-MIMO in which fixed beamforming is adopted. This is because, in fixed beamforming, it is necessary to consider not only a precoding process (that is, multiplication by a precoding matrix) but also a transmission beamforming process (that is, multiplication by a transmission beamforming matrix).

In consideration of the above-stated matters, it is an object of the present invention to suitably determine a precoding matrix in MU-MIMO in which fixed beamforming is adopted.

Means for Solving the Problem

A radio communication control method according to the present invention is a communication control method in a radio communication system that includes a transmitter and a plurality of receivers that carry out radio communication using an MU-MIMO communication scheme. The method includes, for each of plurality of receivers, among the plurality of receivers, that are to perform MU-MIMO communication with the transmitter: calculating excluding channel matrices that include a plurality of equivalent channel matrices acquired by multiplying a transmission beamforming (BF) weight matrix corresponding to that receiver by each of a plurality of channel matrices corresponding to receivers other than that receiver, acquiring a first eigenvector that is included in a right-singular matrix obtained from single value decomposition of the excluding channel matrices, the first eigenvector corresponding to a noise subspace of the excluding channel matrices, acquiring a second eigenvector that is included in a right-singular matrix obtained from single value decomposition of a product of an equivalent channel matrix including the transmit BF weight matrix corresponding to that receiver and the first eigenvector, the second eigenvector corresponding to a signal subspace of the product, and obtaining a precoding matrix corresponding to that receiver by multiplying the first eigenvector by the second eigenvector.

A radio communication system according to the present invention is a radio communication system that includes a transmitter and a plurality of receivers that carry out radio communication using an MU-MIMO communication scheme. The radio communication system includes a precoding controller configured to: for each of plurality of receivers, among the plurality of receivers, that are to perform MU-MIMO communication with the transmitter, calculate excluding channel matrices that include a plurality of equivalent channel matrices acquired by multiplying a transmit BF weight matrix corresponding to that receiver by each of a plurality of channel matrices corresponding to receivers other than that receiver; acquire a first eigenvector that is included in a right-singular matrix obtained from single value decomposition of the excluding channel matrices, the first eigenvector corresponding to a noise subspace of the excluding channel matrices; acquire a second eigenvector that is included in a right-singular matrix obtained from single value decomposition of a product of an equivalent channel matrix including the transmit BF weight matrix corresponding to that receiver and the first eigenvector, the second eigenvector corresponding to a signal subspace of the product; and obtain a precoding matrix corresponding to that receiver by multiplying the first eigenvector by the second eigenvector.

A transmitter according to the present invention is a transmitter that carries out radio communication with a plurality of receivers by using an MU-MIMO communication scheme. The transmitter includes a precoding controller configured to: for each of plurality of receivers, among the plurality of receivers, that are to perform MU-MIMO communication with the transmitter, calculate excluding channel matrices that include a plurality of equivalent channel matrices acquired by multiplying a transmit BF weight matrix corresponding to that receiver by each of a plurality of channel matrices corresponding to receivers other than that receiver; acquire a first eigenvector that is included in a right-singular matrix obtained from single value decomposition of the excluding channel matrices, the first eigenvector corresponding to a noise subspace of the excluding channel matrices; acquire a second eigenvector that is included in a right-singular matrix obtained from single value decomposition of a product of an equivalent channel matrix including the transmit BF weight matrix corresponding to that receiver and the first eigenvector, the second eigenvector corresponding to a signal subspace of the product; and obtain a precoding matrix corresponding to that receiver by multiplying the first eigenvector by the second eigenvector.

Effect of the Invention

According to the present invention, precoding matrices are suitably determined.

MODES FOR CARRYING OUT THE INVENTION

1. First Embodiment 1 (1). Massive-MIMO Transmission

Following is a description of a massive-MIMO transmission scheme according to the first embodiment of the present invention. In a massive-MIMO transmission scheme in which a base station carries out radio communication by using a large number of transmission antennas $A_T$, multiplexing is performed to achieve a high radio communication speed (data rate). Further, since the degree of freedom of antenna control is increased when carrying out beamforming due to the use of a large number of transmission antennas $A_T$, advanced beamforming is achieved as compared to the conventional art. Accordingly, interference reduction and effective use of radio resources are achieved.

The number of transmission antennas $A_T$ provided at a base station adapted for massive-MIMO is preferably 32 or more, 64 or more, 96 or more, 100 or more, 128 or more, 192 or more, 200 or more, 256 or more, 500 or more, 512 or more, 1000 or more, or 1024 or more, but is not limited thereto.

A high-frequency band (for example, a frequency band of 10 GHz or higher) is preferably used in massive-MIMO transmission schemes. Use of a high-frequency band enables a wide bandwidth to be secured (for example, 200 MHz or wider) for radio resources, in contrast to use of a low-frequency band. Since the size of an antenna element is proportional to a wavelength of a signal, it is possible to further miniaturize antennas when using a high-frequency band in which the wavelengths of radio signals are relatively short. On the other hand, the higher a frequency is, the greater an increase in propagation loss is. Thus, even when, for example, radio signals are transmitted from a base station with the same transmission power, use of a high-frequency band results in a drop in received signal strength at a mobile station as compared to when a low-frequency band is used.

Figure 1:
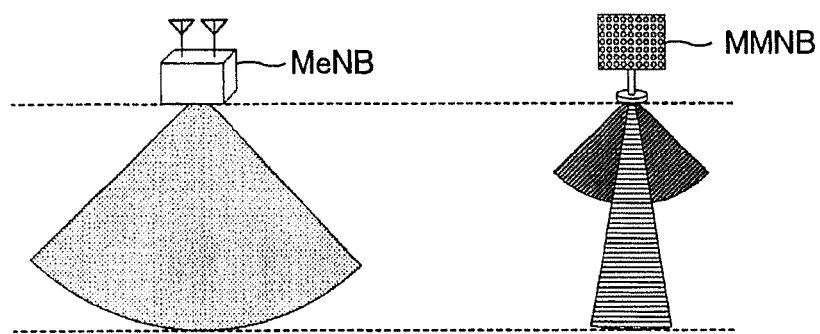
FIG. 1 is a drawing explaining the outline of a massive-MIMO transmission scheme according to a first embodiment.

A drop in received signal strength due to use of a high-frequency band described above can be compensated for by a beamforming gain. FIG. 1 is a schematic drawing indicating a reachable range of a beam (radio signal) according to frequency. Conventional base stations (macro base station MeNB) perform radio communication by using low-frequency bands, thus the beams reach further even when beams with wide radiation patterns are used.

Meanwhile, a base station (small base station MMNB) compatible with the massive-MIMO transmission scheme of the present embodiment performs radio communication by using a high-frequency band, resulting in a short beam-reaching distance compared to a macro base station MeNB when a beam having a wide radiation pattern is used. However, when the width of a beam radiation pattern is reduced by means of beamforming, it is possible, for even a small base station MMNB in which a high-frequency band is used, to increase a distance reached by a beam.

Figure 2:
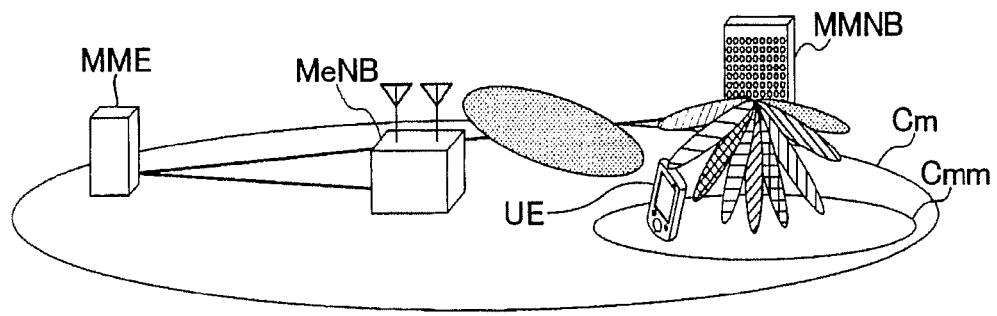
FIG. 2 is a schematic block diagram of a radio communication system according to the first embodiment.

FIG. 2 is a schematic block diagram of a radio communication system 1 according to the first embodiment. Radio communication system 1 includes a macro base station MeNB, a small base station MMNB, a central control station MME, and user equipment UE. The small base station MMNB is compatible with the massive-MIMO transmission scheme.

The macro base station MeNB has a macro cell Cm formed on the surroundings thereof, and the small base station MMNB has a massive-MIMO cell (MM-cell) Cmm formed on the surroundings thereof. The frequency band (for example, a 10 GHz band) used in the small base station MMNB has a higher frequency and greater propagation loss compared to a frequency band (for example, a 2 GHz band) used in the macro base station MeNB, thus the cell size of MM-cell Cmm is smaller than the cell size of Macro cell Cm. Accordingly, the small base station MMNB and user equipment UE are likely to be connected via line-of-sight.

As indicated in FIG. 2, it is possible for MM-cell Cmm to overlap with an area, such as macro cell Cm, in which radio communication can be achieved by using another radio access technology (RAT). As a result, with respect to user equipment UE positioned in an overlapping region, support exists for multiple connectivity under a plurality of radio access technologies.

Further, a control signal can be transmitted to a user equipment UE that is currently in communication with small base station MMNB compatible with the massive-MIMO transmission scheme, from a macro base station MeNB that is compatible with different radio access technology. Another example of radio access technology includes a public or local wireless LAN.

As described above, in massive-MIMO transmission in which a high-frequency band is used, it is preferable to compensate for propagation loss by way of a gain achieved by beamforming. To achieve radio communication at a high speed, preferably a plurality of data streams are spatially multiplexed and transmitted. In such a multiplex transmission, it is preferable not only for a beam to be controlled by beamforming, but also for inter-stream multiplexing to be compensated for by use of precoding.

Figure 3:
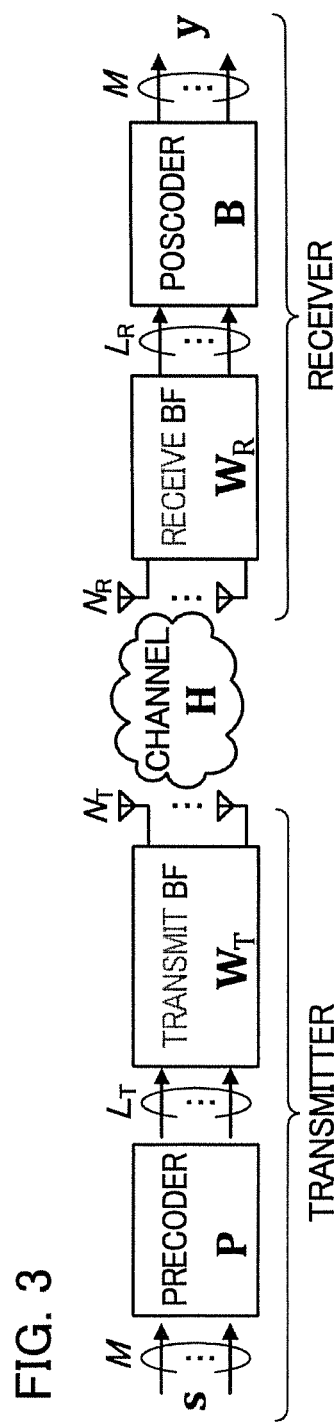
FIG. 3 is a drawing illustrating the functional configuration of massive-MIMO transmission according to the first embodiment.

FIG. 3 is a drawing illustrating one example of a transmitter/receiver configuration in massive-MIMO in which fixed beamforming is adopted. FIG. 3 illustrates a configuration based on SU-MIMO in which exist a single transmitter and a single receiver. The precoder and transmit beamformer of the transmitter (for example, small base station MMNB) respectively carry out precoding and transmission beamforming, and the receive beamformer and postcoder of the receiver (for example, user equipment UE) respectively carry out receive beamforming and postcoding.

Mathematically, a precoding process is a process in which an M-by-1 signal vector S representing M (M is an integer of 2 or higher; M=16, for example) streams is multiplied by an $L_T$-by-M ($L_T$ is the number of transmission beams) precoding matrix P. A transmission beamforming process is a process in which a signal that has been subjected to precoding is multiplied by an $N_T$-by-$L_T$ ($N_T$ is the number of transmission antennas; $N_T$=256, for example) transmit BF (beamforming) weight matrix T. After transmission beamforming, the signal transmitted from a transmission antenna $A_T$ is multiplied by an $N_R$-by-$N_T$ ($N_R$ is the number of reception antennas; $N_R$=16, for example) channel matrix H corresponding to the spatial propagation. A receive beamforming process is a process in which a signal received by a reception antenna $A_R$ is multiplied by an $L_R$-by-$N_R$ ($L_R$ is the number of reception beams) receive BF weight matrix $W_R$. A postcoding process is a process in which the signal that has been subjected to receive beamforming is multiplied by an M-by-$L_R$ postcoding matrix B. In light of the above-stated matter, an M-by-1 signal vector y after postcoding is expressed by the following equation.

$$y=BW_RHW_TPs+Bz$$

Here, the additional term z included in the above equation is an $L_R$-by-1 noise vector.

Figure 4:
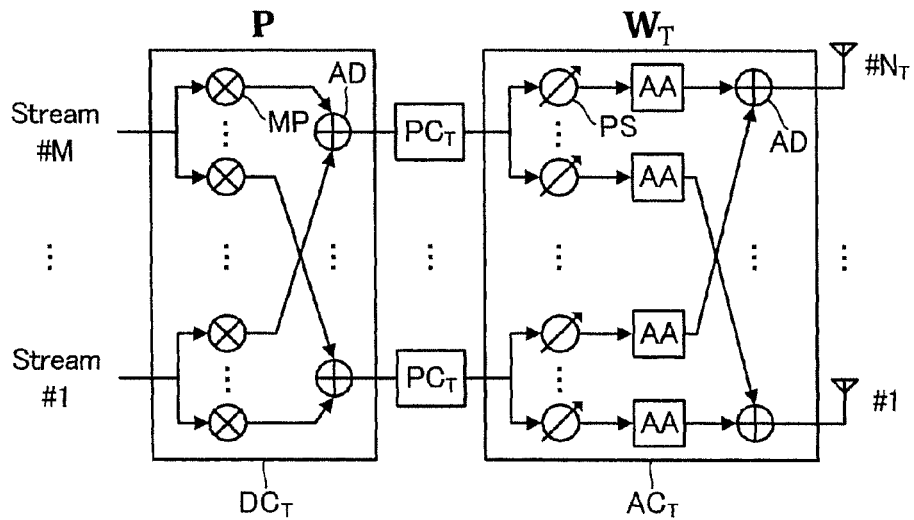
FIG. 4 is a drawing illustrating an example of the circuitry configuration of a transmitter according to the first embodiment.
Figure 5:
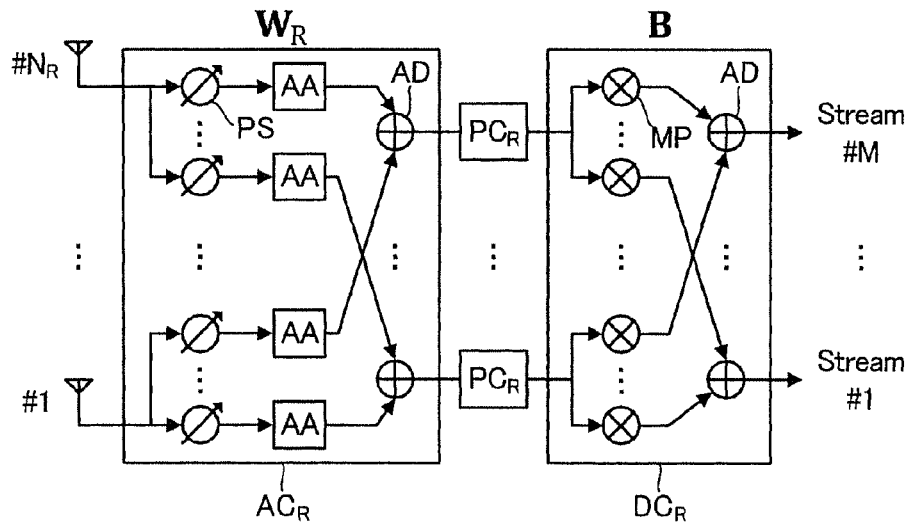
FIG. 5 is a drawing illustrating an example of the circuitry configuration of a receiver according to the first embodiment.

As a more suitable mode for massive-MIMO transmission in the present embodiment, digital precoding is adopted as the precoding, while analog fixed beamforming is adopted as the transmit/receive beamforming, and digital postcoding is adopted as the postcoding. Each of FIGS. 4 and 5 illustrates, in a non-limiting manner, an example of a specific circuitry configuration. FIG. 4 illustrates transmitter-side equivalent circuitry, and FIG. 5 illustrates receiver-side equivalent circuitry.

As illustrated in FIG. 4, on the transmitter side, M streams are subjected to digital precoding (matrix operation) by means of a digital signal processing circuitry $DC_T$ having a plurality of multipliers MP and adders AD, and subsequently, a processing circuitry $PC_T$ carries out an inverse Fourier transformation, insertion of a guard interval, digital-to-analog (DA) conversion, and up-conversion, thereby generating a high-frequency transmitted signal. The high-frequency transmitted signal is subjected to phase and amplitude modification (in other words, is subjected to analog transmit beamforming) by an analog signal processing circuitry $AC_T$ having a plurality of variable phase shifters PS and/or amplitude adjusters AA, and an adder AD, and is subsequently transmitted from $N_T$ number of transmission antennas $A_T$.

As illustrated in FIG. 5, on the receiver side, a high-frequency received signal received by $N_R$ number of reception antennas $A_R$ is subjected to phase and amplitude modification (in other words, is subjected to analog receive beamforming) by an analog signal processing circuitry $AC_R$ having a plurality of variable phase shifters PS, amplitude adjusters AA, and adders AD. Subsequently, processing circuitry $PC_R$ carries out down-conversion, analog-to-digital (AD) conversion, and Fourier transformation on the signal that has been subjected to receive beamforming, and a digital signal processing circuitry $DC_R$ subjects the signal to digital postcoding (matrix operation), thereby generating (regenerating) M number of streams.

The above-stated configuration is especially suited to a massive-MIMO transmission scheme in which the number $N_T$ of transmission antennas is sufficiently large with respect to the number M of streams to be transmitted (in other words, M<<$N_T$). Generally, when the number $N_T$ of transmission antennas is greater than the number M of transmission streams, prior to transmission of a radio signal, it is necessary to carry out an $N_T$-by-M matrix operation, by which M number of stream components are converted into $N_T$ number of transmission antenna components. In the present embodiment, in mathematical terms, M stream components are converted into $N_T$ transmission antenna components by means of matrix operation of an $L_T$-by-M precoding matrix P and an $N_T$-by-$L_T$ transmit BF weight matrix $W_T$, as described above.

In the above-stated configuration, only precoding is carried out by digital signal processing circuitry $DC_T$ on the transmission side. Therefore, compared to a configuration in which precoding and transmit beamforming are digitally processed, the circuitry size and computational complexity of digital signal processing circuitry $DC_T$ can be reduced, and the number of DA converter (processing circuitry $PC_T$) channels can be reduced. Accordingly, simplification of the configuration and use of a large number of transmission antennas $A_T$ can be achieved simultaneously. The same applies to the reception side (postcoding and receive beamforming).

1 (2). Multiuser MIMO (MU-MIMO)

Figure 6:
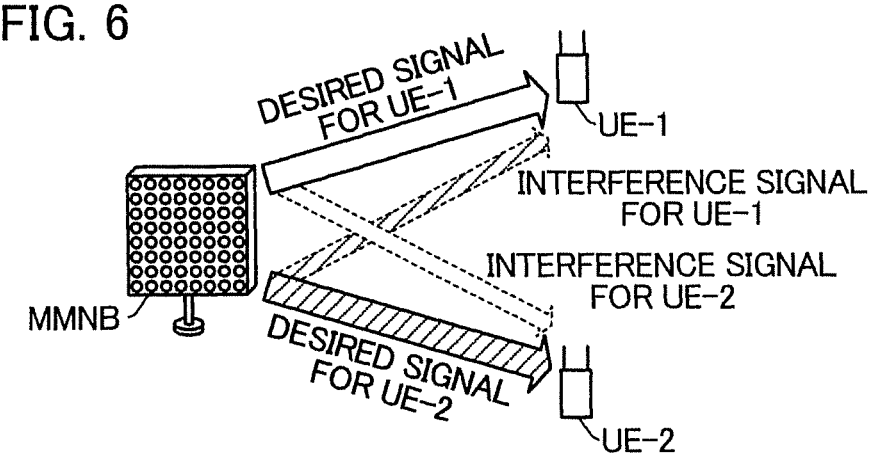
FIG. 6 is a conceptual diagram of MU-MIMO according to the first embodiment.

Following is description of MU-MIMO according to the first embodiment of the present invention. FIG. 6 is a conceptual diagram of MU-MIMO. In MU-MIMO, small base station MMNB, which is a single MIMO base station, simultaneously transmits multiplexed signals to a plurality of user equipments UE by using a plurality of transmission antennas $A_T$. That is, the MIMO base station can perform radio communication simultaneously with a plurality of users by user multiplexing. With MU-MIMO, channel correlation between a plurality of users is reduced, and the total communication speed of all user equipments UE is thereby improved.

Meanwhile, as illustrated in FIG. 6, interference occurs between a plurality of users due to user multiplexing. For example, a desired signal for a first user equipment UE-1 becomes an interference signal for a second user equipment UE-2, and vice versa. Accordingly, interference control for reduction of inter-user reduction is necessary.

Figure 7:
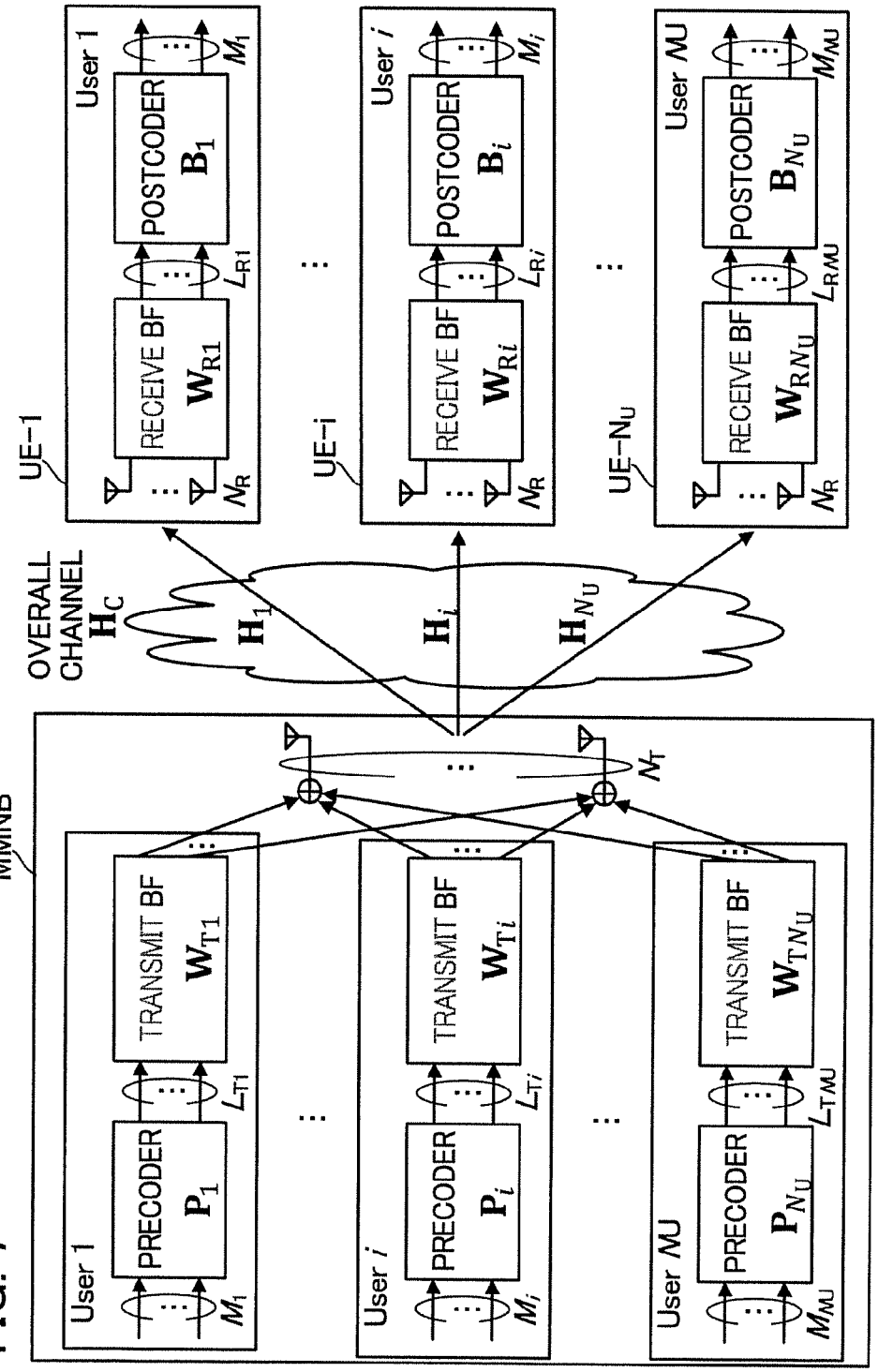
FIG. 7 is a drawing illustrating an example of the configuration of the transmitter and receivers in massive-MIMO in which fixed beamforming is adopted according to the first embodiment.

FIG. 7 is a drawing illustrating one example of a transmitter/receiver configuration in massive-MIMO in which fixed beamforming is adopted. FIG. 7 illustrates a configuration based on MU-MIMO in which exist a single transmitter and a plurality of receivers. Hereafter, the total number of users (number of receivers) is referred to as $N_U$, and the total number of streams for all users is referred to as M. A certain single user is represented by i ($1 \le i \le N_U$), and the number of streams for an i-th user is represented by $M_i$.

The precoder and transmit beamformer of small base station MMNB, which is the transmitter, respectively carry out precoding and transmit beamforming for signals assigned to each of user equipments UE, which are the receivers (first user equipment UE-1, . . . , i-th user equipment UE-i, . . . , $N_U$th user equipment UE-$N_U$). Signals for all user equipments UE are added and transmitted from $N_T$ transmission antennas $A_T$. The total number of transmission beams for all users is $L_T$ and the number of transmission beams for the i-th user is $L_{Ti}$ (for example, $L_{Ti} = L_T/N_U$). Each user equipment UE receives signals by using $N_R$ reception antennas $A_R$, and the receive beamformer and postcoder of each user equipment UE respectively carry out receive beamforming and postcoding.

Mathematically, the precoding process for an i-th user is a process in which an $N_R$-by-1 signal vector $s_i$ is multiplied by an $L_{Ti}$-by-$N_R$ precoding matrix $P_i$. The above-stated signal vector is represented by the following equation.

$$s_i = [d_i^T 0^T]^T$$

In the above equation, $d_i$ is an $M_i$-by-1 data signal vector corresponding to $M_i$ streams, and 0 is an ($N_R$-$M_i$)-by-1 zero vector. $(\bullet)^T$ indicates the transposition of a matrix or a vector.

The transmit beamforming process for an i-th user is a process in which signals that have been subjected to precoding process are multiplied by an $N_T$-by-$L_{Ti}$ transmit BF weight matrix $W_{Ti}$. Here, if an $N_T$-by-1 transmit BF weight vector corresponding to each of $L_{Ti}$ transmission beams is represented by $W_{Ti,l}$ a transmit BF weight matrix can be represented as follows.

$$W_{Ti} = [W_{Ti,1} W_{Ti,2} \ldots W_{Ti,L_{Ti}}]$$

The above precoding process and transmit beamforming process (hereafter sometimes collectively referred to as transmission-side signal processing) are carried out for all users (UE-1, . . . , UE-i, . . . , UE-$N_U$). The $N_T$ number of signals for each user obtained as a result of performing transmission-side signal processing for all users are distributed to $N_T$ adders and added, and transmitted from $N_T$ transmission antennas $A_T$. That is, signal components for all users may be included in signals transmitted from one transmission antenna $A_T$.

Signals transmitted from $N_T$ transmission antennas $A_T$ are received by each user equipment UE. Signals received by an i-th user equipment UE-i are multiplied by an $N_R$-by-$N_T$ channel matrix $H_i$ corresponding to propagation through space from small base station MMNB to user equipment UE-i. Here, the above-stated channel matrix differs according to the user equipment UE. Accordingly, an ($N_R \cdot N_U$)-by-$N_T$ overall channel matrix $$H_C = \begin{bmatrix} H_1 \\ \vdots \\ H_i \\ \vdots \\ H_{N_U} \end{bmatrix}$$

is formed in the overall MU-MIMO system of the present example. $N_R \cdot N_U$ indicates the overall number of reception antennas $A_R$ of the system.

The receive beamforming process for an i-th user is a process in which received signal vectors (details described below) received by reception antenna $A_R$ are multiplied by an $N_R$-by-$N_R$ receive BF weight matrix $W_{Ri}$. Postcoding process for an i-th user is a process in which signals that have been subjected to receive beamforming are multiplied by an $N_R$-by-$N_R$ postcoding matrix $B^i$. An $N_R$-by-1 signal vector $y_i$ is obtained by a postcoding process. Here, rows 1 to $M_i$ of $y_i$ are data signal vectors corresponding to estimated (regenerated) $M_i$ streams, and the remaining lines ($M_1$+1) to $N_R$ are zero vectors.

1 (3). Configuration of Transmitter and Receiver

Figure 8:
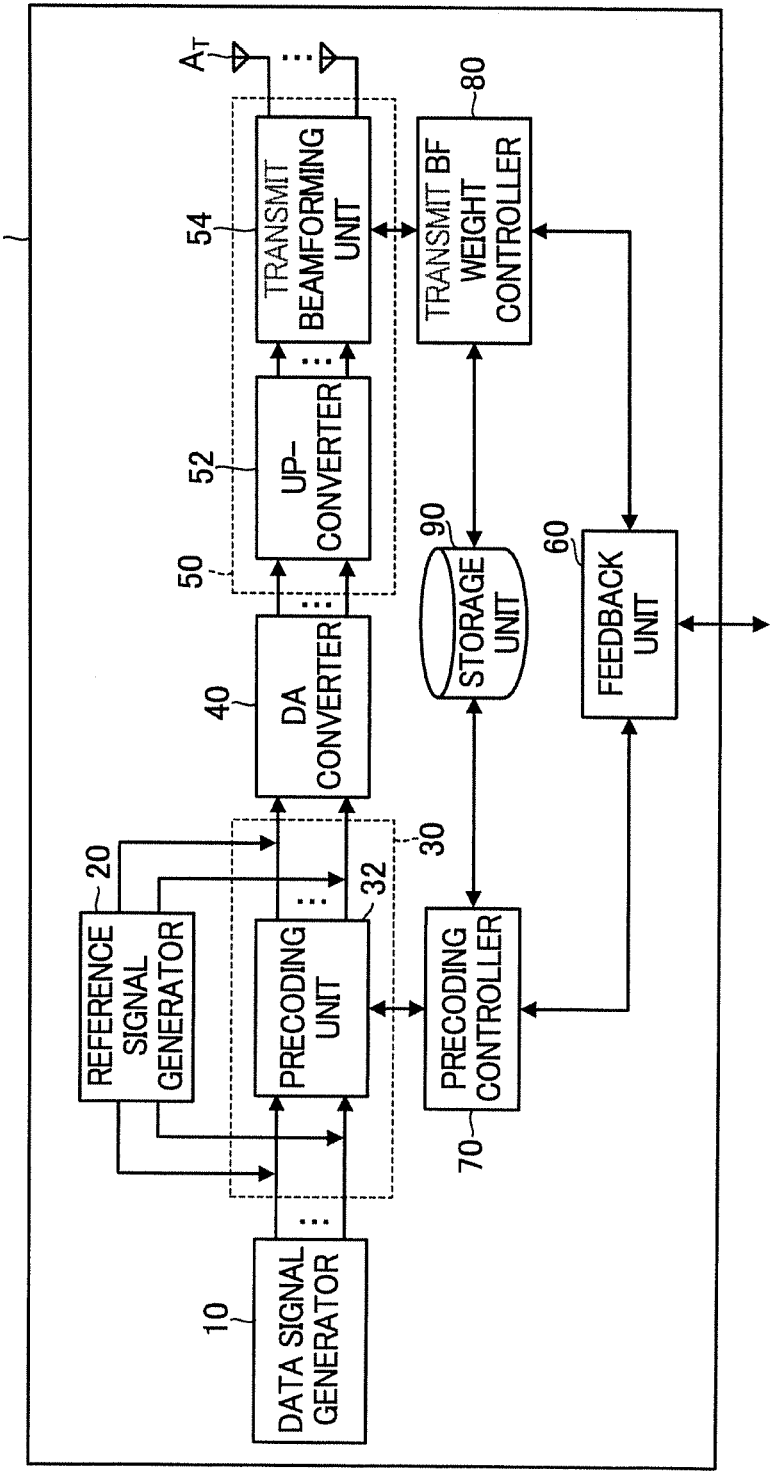
FIG. 8 is a functional block diagram of a small base station in the first embodiment.

FIG. 8 is a functional block diagram illustrating main constituent elements of small base station MMNB (transmitter) of the first embodiment. Small base station MMNB includes a data signal generator 10, a reference signal generator 20, a baseband processor 30, a DA converter 40, an RF processor 50, a feedback unit 60, a precoding controller 70, a transmit BF weight controller 80, and a storage unit 90. Baseband processor 30 includes a precoding unit 32, and RF processor 50 includes an up-converter 52 and a transmit beamforming unit 54. $N_T$ number of transmission antennas $A_T$ are connected to transmit beamforming unit 54. The carrier configuration adopted in small base station MMNB of the present embodiment can be freely chosen. For example, a single carrier (SC) may be adopted, or orthogonal frequency division multiplexing (OFDM) may be adopted.

Data signal generator 10 generates data signals to be included in transmitted signals for user equipment UE. Data signal generator 10 can generate data signals as a stream of a plurality of sequences. In the present embodiment, data signal generator 10 generates data signals of M streams corresponding to $N_U$ user equipments UE (as described above, the number of streams for an i-th user is $M_i$).

Reference signal generator 20 generates reference signals to be included in transmitted signals for user equipment UE. A reference signal is, for example, a signal used for channel estimation in user equipment UE, initial synchronization of user equipment UE and small base station MMNB, and identification of small base station MMNB in user equipment UE. The generated data signals and reference signals are input to baseband processor 30 as baseband signals.

Baseband processor 30 is an element for processing input baseband signals (for example, data signals, reference signals). Baseband processor 30 includes a precoding unit 32 that subjects the signal vectors of an i-th user to digital precoding (matrix operation) by using precoding matrix $P_i$. Precoding unit 32 carries out the above-stated digital precoding on a total of M streams corresponding to all users (UE-1, . . . , UE-$N_U$). That is, precoding unit 32 operates as $N_U$ number of precoders.

In ordinary radio transmission, a signal combining a data signal and a reference signal is precoded by precoding unit 32, and output from baseband processor 30. Meanwhile, concerning estimation of an equivalent channel matrix in the present embodiment, a reference signal that has not been precoded is output from baseband processor 30.

DA converter 40 converts digital signals output from baseband processor 30 into analog signals, and outputs the signals to RF processor 50. RF processor 50 is an element that processes input analog signals and transmits the signals from transmission antennas $A_T$. RF processor 50 includes an up-converter 52 that frequency-converts input analog signals into radio frequency (RF) signals, and a transmit beamforming unit 54 that subjects signals that have been frequency-converted to analog transmit beamforming based on a transmit BF weight matrix $W_{Ti}$. Transmit beamforming unit 54 carries out the above-stated beamforming for a total of $L_T$ signals corresponding to all transmission beams of all users (UE-1, . . . , UE-$N_U$). That is, transmit beamforming unit 54 operates as $N_U$ number of transmit beamformers.

High-frequency signals output from transmit beamforming unit 54 (each transmit beamformer) are added by $N_T$ number of adders provided in transmit beamforming unit 54, and transmitted from $N_T$ transmission antennas $A_T$. The above-stated analog beamforming is a process in which phase and amplitude changes, which correspond to multiplication by a transmit BF weight matrix, are applied to analog signals by using variable phase shifters PS and amplitude adjusters AA. In other words, in the above-stated analog transmit beamforming, phase and amplitude between a plurality of transmission antennas $A_T$ (between signals transmitted from a plurality of transmission antennas $A_T$) are changed in an analog manner so as to correspond to the multiplication by a transmit BF weight matrix.

Feedback unit 60 is an element that performs communication pertaining to control with user equipment UE, and in particular, supplies feedback information from user equipment UE to precoding controller 70 and transmit BF weight controller 80. Precoding controller 70 controls precoding matrices used in precoding unit 32. Transmit BF weight controller 80 controls BF weight used in transmit beamforming unit 54. Storage unit 90 stores information pertaining to control of radio communication (for example, precoding matrices, transmit BF weight matrices).

Of the elements included in small base station MMNB, those that carry out digital processing (for example, data signal generator 10, reference signal generator 20, baseband processor 30, feedback unit 60, precoding controller 70, and transmit BF weight controller 80) are functional blocks attained by use of a central processing unit (CPU), which is not illustrated, carrying out a computer program stored in storage unit 90 and functioning in accordance with the computer program.

Figure 9:
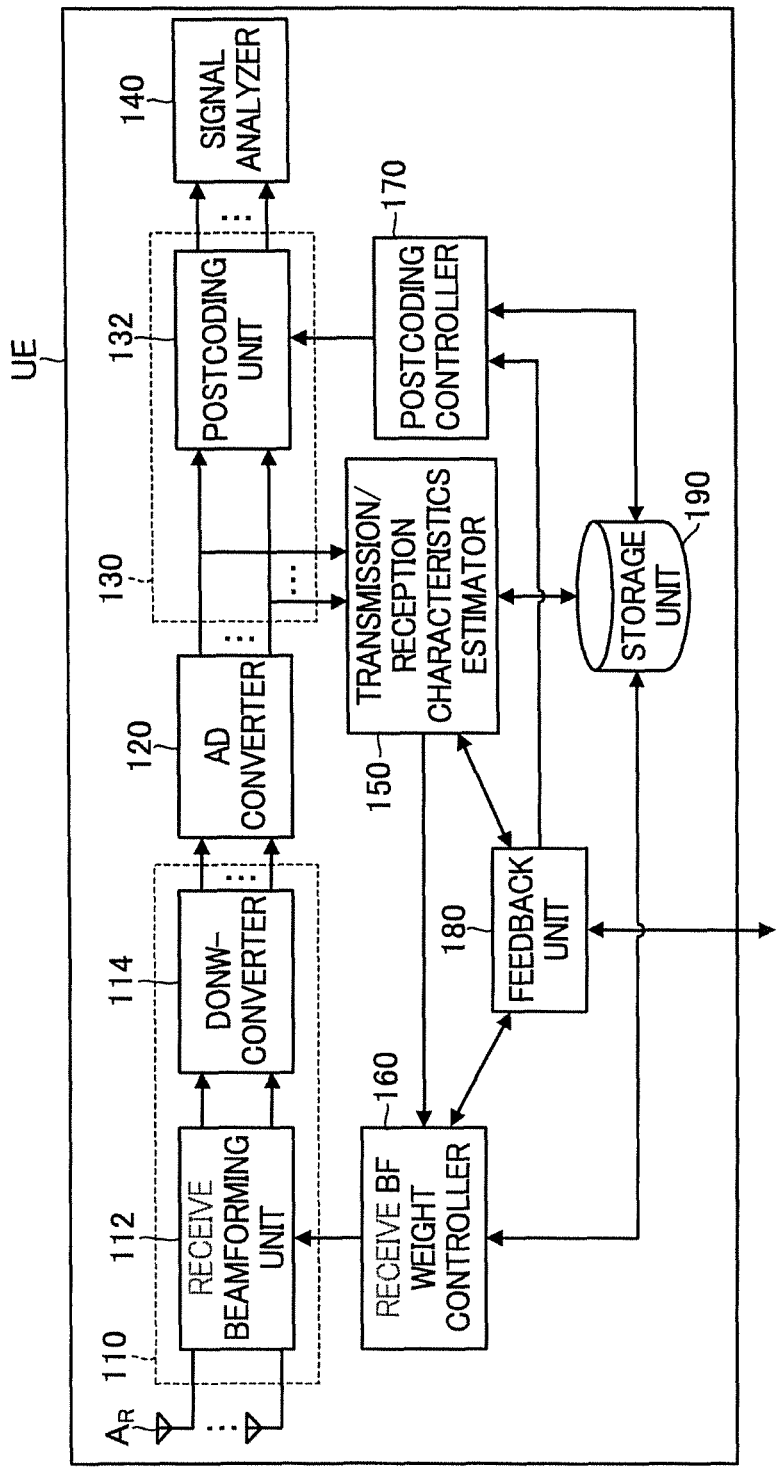
FIG. 9 is a functional block diagram of a user equipment in the first embodiment.

FIG. 9 is a functional block diagram illustrating the main constituent elements of an i-th user's user equipment UE (receiver) of the first embodiment. User equipment UE includes an RF processor 110, an AD converter 120, a baseband processor 130, a signal analyzer 140, a transmission/reception characteristic estimator 150, a receive BF weight controller 160, a postcoding controller 170, a feedback unit 180, and a storage unit 190. RF processor 110 includes a receive beamforming unit 112 and a down-converter 114, and baseband processor 130 includes a postcoding unit 132. $N_R$ number of reception antennas $A_R$ are connected to receive beamforming unit 112.

Radio signals transmitted from small base station MMNB, which is the transmitter, and that have propagated through a space, are received by $N_R$ number of reception antennas $A_R$ and input to RF processor 110.

RF processor 110 is an element that processes signals received by a plurality of reception antennas $A_R$. RF processor 110 includes a receive beamforming unit 112 that subjects received signals to analog receive beamforming based on a receive BF weight matrix $W_{Ri}$, and a down-converter 114 that frequency-converts the input signals into baseband signals and outputs the signals. The above-stated analog receive beamforming is a process in which phase and amplitude changes, which correspond to multiplication by a receive BF weight matrix, are applied to analog signals by using variable phase shifters PS and amplitude adjusters AA. In other words, in the above-stated analog receive beamforming, the phase and amplitude between a plurality of reception antennas $A_R$ (between signals transmitted from a plurality of reception antennas $A_R$) change in an analog manner so as to correspond to the multiplication by a receive BF weight matrix.

AD converter 120 converts analog signals output from RF processor 110 into digital signals, and outputs the signals to baseband processor 130.

Baseband processor 130 is an element that processes input baseband signals and restores $M_i$ number of streams. Baseband processor 130 includes a postcoding unit 132 that subjects signals output from AD converter 120 to digital postcoding (matrix operation) by using a postcoding matrix $B_i$. $M_i$ streams are regenerated by the above-stated postcoding. The regenerated $M_i$ streams are input to signal analyzer 140 and are analyzed.

Transmission/reception characteristic estimator 150 carries out estimation of transmission/reception characteristics, which will be described later. Receive BF weight controller 160 controls BF weight used in receive beamforming unit 112. Postcoding controller 170 controls postcoding matrices used in postcoding unit 132. Feedback unit 180 is an element that performs communication pertaining to control with small base station MMNB, and in particular, transmits feedback information from transmission/reception characteristic estimator 150 and receive BF weight controller 160 to small base station MMNB. Storage unit 190 stores information pertaining to control of radio communication control (for example, postcoding matrices, receive BF weight matrices).

Of the elements included in user equipment UE, elements that carry out digital processing (for example, baseband processor 130, signal analyzer 140, transmission/reception characteristic estimator 150, receive BF weight controller 160, postcoding controller 170, feedback unit 180) are functional blocks enabled by use of a central processing unit (CPU), which is not illustrated, carrying out a computer program stored in storage unit 190 and functioning in accordance with the computer program.

1 (4). Determination of Precoding Matrices 1 (4)-1. Separation of Received Signals by Block Diagonalization If an $N_R$-by-1 received signal vector in an i-th user equipment UE-i is represented by $r_i$, the received signal vectors (received signal vectors of the entire MU-MIMO system) of all user equipments UE $(1, \ldots, N_U)$ are represented as follows.

$$\begin{bmatrix} r_1 \\ \vdots \\ r_{N_U} \end{bmatrix} = H_C [W_{T1} \ldots W_{TN_U}] diag[P_1 \ldots P_{N_U}] \begin{bmatrix} s_1 \\ \vdots \\ s_{N_U} \end{bmatrix} + \begin{bmatrix} z_1 \\ \vdots \\ z_{N_U} \end{bmatrix} \quad (1)$$

$$= \begin{bmatrix} H_1 W_{T1} & \ldots & H_1 W_{TN_U} \\ \vdots & \ddots & \vdots \\ H_{N_U} W_{T1} & \ldots & H_{N_U} W_{TN_U} \end{bmatrix} diag[P_1 \ldots P_{N_U}]$$

$$\begin{bmatrix} s_1 \\ \vdots \\ s_{N_U} \end{bmatrix} + \begin{bmatrix} z_1 \\ \vdots \\ z_{N_U} \end{bmatrix}$$

$$= \begin{bmatrix} H_1 W_{T1} P_1 & \ldots & H_1 W_{TN_U} P_{N_U} \\ \vdots & \ddots & \vdots \\ H_{N_U} W_{T1} P_1 & \ldots & H_{N_U} W_{TN_U} P_{N_U} \end{bmatrix} \begin{bmatrix} s_1 \\ \vdots \\ s_{N_U} \end{bmatrix} + \begin{bmatrix} z_1 \\ \vdots \\ z_{N_U} \end{bmatrix}$$

The non-diagonal components, $H_k W_{Ti} P_i (k \neq i)$, of the matrix $$\begin{bmatrix} H_1 W_{T1} P_1 & \ldots & H_1 W_{TN_U} P_{N_U} \\ \vdots & \ddots & \vdots \\ H_{N_U} W_{T1} P_1 & \ldots & H_{N_U} W_{TN_U} P_{N_U} \end{bmatrix} \quad (2)$$

in the above equation (1) correspond to interference components applied, by signals addressed to the i-th user, to signals addressed to k-th users, who are users other than the i-th user. Therefore, by precoding controller 70 setting each precoding matrix $P_i$ so as to be $$H_k W_{Ti} P_i = 0 (k \neq i),$$

all non-diagonal components (interference components) of the above-stated matrix (2) can be made 0 (that is, matrix (2) can be block-diagonalized).

Equation (1) after matrix (2) has been subjected to block diagonalization is represented by the following equation.

$$\begin{bmatrix} r_1 \\ \vdots \\ r_{N_U} \end{bmatrix} = \begin{bmatrix} H_1 W_{T1} P_1 & & 0 \\ & \ddots & \\ 0 & & H_{N_U} W_{TN_U} P_{N_U} \end{bmatrix} \begin{bmatrix} s_1 \\ \vdots \\ s_{N_U} \end{bmatrix} + \begin{bmatrix} z_1 \\ \vdots \\ z_{N_U} \end{bmatrix} \quad (3)$$

Based on the above-stated equation (3), the received signal vector of the i-th user is represented as follows.

$$r_i = H_i W_{Ti} P_i s_i + z_i$$

That is, by precoding controller 70 setting each precoding matrix $P_i$ so as to subject matrix (2) to block diagonalization, for the i-th user equipment UE-i, a transmit BF weight matrix $W_{Ti}$ corresponding to the user equipment UE-i can be selected, and impact (channel response) of channel matrices $$H_k (k=1, \ldots, i-1, i+1, \ldots, N_U)$$

other than the channel matrix $H_i$ corresponding to user equipment UE-i can be eliminated (that is, a plurality of users compatible with MU-MIMO can be orthogonalized). As a result, the received signal vector that does not include interference signal components can be obtained for the i-th user.

1 (4)-2. Precoding Matrix Calculation for Realizing Block Diagonalization $N_U$ number of precoding matrices $$P_i (i=1 \ldots N_U)$$

to block-diagonalize the abovementioned matrix (2)

$$\begin{bmatrix} H_1 W_{T1} P_1 & \ldots & H_1 W_{TN_U} P_{N_U} \\ \vdots & \ddots & \vdots \\ H_{N_U} W_{T1} P_1 & \ldots & H_{N_U} W_{TN_U} P_{N_U} \end{bmatrix}$$

are calculated by precoding controller 70. Hereafter, a transmit BF weight matrix and a channel matrix are treated as one entity by representing them as follows.

$$H_k W_{Ti} = H_{k,i}$$

The matrix $H_{k,i}$ may hereafter be referred to as "equivalent channel matrix".

Of the equivalent channel matrices $$H_{1,i}, \ldots, H_{i,i}, \ldots, H_{N_U,i}$$

including the transmit BF weight matrix corresponding to the i-th user, a set of $(N_R \cdot (N_U - 1))$-by-$L_{Ti}$ equivalent channel matrices (excluding channel matrices) that excludes equivalent channel matrix $H_{i,i}$, which includes a channel matrix corresponding to the i-th user, are defined as follows.

$$\tilde{H}'_i = [(H_{1,i})^T, \ldots, (H_{i-1,i})^T (H_{i+1,i})^T, \ldots, (H_{N_U,i})^T]^T$$

The above-stated excluding channel matrices can be expressed as a set including a plurality of equivalent channel matrices obtained by multiplying the transmit BF weight matrix $W_{Ti}$, which corresponds to the i-th user, by each of the channel matrices $$H_1, \ldots, H_{i-1}, H_{i+1}, \ldots, H_{N_U}$$

corresponding to users other than the i-th user.

The following equation (4) is obtained by single value decomposition of the above excluding channel matrices.

$$\tilde{H}'_i = \tilde{U}'_i \tilde{\Sigma}'_i (\tilde{V}'_i)^H \quad (4)$$

$$= \tilde{U}'_i \tilde{\Sigma}'_i [\tilde{V}'^{(1)}_i \; \tilde{V}'^{(2)}_i]^H$$

Here, $(\bullet)^H$ indicates a conjugate transpose matrix.

In the above equation (4), left-singular matrix $\tilde{U}'_i$ is an $(N_R \cdot (N_U - 1))$-by-$(N_R \cdot (N_U - 1))$ unitary matrix. Right-singular matrix $\tilde{V}'_i$ is an $L_{Ti}$-by-$L_{Ti}$ unitary matrix. Singular value matrix $\tilde{\Sigma}'_i$ is an $(N_R \cdot (N_U - 1))$-by-$L_{Ti}$ matrix having the singular value of $\tilde{H}'_i (\tilde{H}'_i)^H$ as a diagonal component and zero as a non-diagonal component. Moreover, $\tilde{V}'^{(1)}_i$ is an $L_{Ti}$-by-$(N_R \cdot (N_U-1))$ matrix, and $\tilde{V}'^{(2)}_i$ is an $L_{Ti}$-by-$(L_{Ti}-N_R \cdot (N_U-1))$ matrix.

$\tilde{V}'^{(2)}_i$ is an eigenvector (first eigenvector) that corresponds to a noise subspace, on the transmitter side, of excluding channel matrices $\tilde{H}'_i$ and is used for block diagonalization in the present embodiment.

Here, first eigenvector $\tilde{V}'^{(2)}_i$ satisfies the following equation (5).

$$H_{k,i}\tilde{V}'^{(2)}_i = H_k W_{Ti}\tilde{V}'^{(2)}_i \begin{cases} = 0 (i \neq k) \\ \neq 0 (i = k) \end{cases} \quad (5)$$

Next, the below equation (6) is obtained by single value decomposition of the product, $H_{k,i}\tilde{V}'^{(2)}_i$ of the equivalent channel matrix and the first eigenvector.

$$\begin{aligned} H_{k,i}\tilde{V}'^{(2)}_i &= U'_i \Sigma'_i (V'_i)^T \\ &= U'_i \Sigma'_i [V'^{(1)}_i \; V'^{(2)}_i]^T \end{aligned} \quad (6)$$

In the above equation (5), left-singular matrix $U'_i$ is an $N_R$-by-$N_R$ unitary matrix. Right-singular matrix $V'_i$ is an $(L_{Ti}-N_R \cdot (N_U-1))$-by-$(L_{Ti}-N_R \cdot (N_U-1))$ unitary matrix. Singular value matrix $\Sigma'_i$ is an $N_R$-by-$(L_{Ti}-N_R \cdot (N_U-1))$ matrix having the singular value of $H_{k,i}\tilde{V}'^{(2)}_i(H_{k,i}\tilde{V}'^{(2)}_i)^H$ as a diagonal component and zero as a non-diagonal component. Moreover, $V'^{(1)}_i$ is an $(L_{Ti}-N_R \cdot (N_U-1))$-by-$N_R$ matrix, and $V'^{(2)}_i$ is an $(L_{Ti}-N_R \cdot (N_U-1))$-by-$(L_{Ti}-N_R \cdot (N_U-1)-N_R)$ matrix.

$V'^{(1)}_i$ is an eigenvector (second eigenvector) that corresponds to a signal subspace, on the transmitter side, of $H_{k,i}\tilde{V}'^{(2)}_i$ and is used for block diagonalization in the present embodiment.

Based on the eigenvectors (first eigenvector and second eigenvector) obtained as described above, a precoding matrix for the i-th user is calculated as indicated in the following equation (7).

$$P_i = \tilde{V}'^{(2)}_i V'^{(1)}_i \quad (7)$$

Moreover, a postcoding matrix for the i-th user is calculated as indicated in the following equation (8).

$$B_i = (U'_i)^H \quad (8)$$

When the above equation (7) is substituted in the non-diagonal component $H_k W_{Ti} P_i (k \neq i)$ of matrix (2), $$H_k W_{Ti}\tilde{V}'^{(2)}_i V'^{(1)}_i (k \neq i)$$

is obtained. Based on the relationship in equation (5), the above non-diagonal component becomes 0.

As described above, by precoding controller 70 setting a precoding matrix for each user as indicated in equation (7), matrix (2) becomes block-diagonalized, and equation (3) holds (that is, a plurality of users compatible with MU-MIMO are mutually orthogonalized).

If the postcoding matrix in equation (8) is used, equation (3) can be further modified as follows.

$$\begin{bmatrix} B_1 r_1 \\ \vdots \\ B_{N_U} r_{N_U} \end{bmatrix} = \begin{bmatrix} B_1 H_1 W_{T1} P_1 & & 0 \\ & \ddots & \\ 0 & & B_{N_U} H_{N_U} W_{T N_U} P_{N_U} \end{bmatrix}$$

-continued $$\begin{bmatrix} s_1 \\ \vdots \\ s_{N_U} \end{bmatrix} + \begin{bmatrix} B_1 z_1 \\ \vdots \\ B_{N_U} z_{N_U} \end{bmatrix}$$

$$= \begin{bmatrix} \Sigma'_1 & & 0 \\ & \ddots & \\ 0 & & \Sigma'_{N_U} \end{bmatrix} \begin{bmatrix} s_1 \\ \vdots \\ s_{N_U} \end{bmatrix} + \begin{bmatrix} B_1 z_1 \\ \vdots \\ B_{N_U} z_{N_U} \end{bmatrix}$$

For the above-stated block diagonalization to hold, the number $L_{Ti}$ of transmission beams used by each user (i-th user) must be at least the overall number $N_R \cdot N_U$ of reception antennas $A_R (L_{Ti} \geq N_R \cdot N_U)$. Moreover, as described above, for the number of transmission beams of the i-th user to be represented by $L_{Ti} = L_T/N_U$, the number $L_T$ of transmission beams of the entire system must be at least $N_R \cdot N_U^2$ ($L_T \geq N_R \cdot N_U^2$).

1 (4)-3. Determination of Weight Matrices

As described above, by $N_U$ precoding matrices $P_i$ (i=1 ... $N_U$) being determined by precoding controller 70, overall channel matrix $H_C$ in the MU-MIMO system is block-diagonalized. In other words, only when precoding matrix $P_i$ is determined as described above, can transmit BF weight matrix $W_{Ti}$ and receive BF weight matrix $W_{Ri}$ be freely determined.

In the present embodiment, transmit BF weight controller 80 may determine transmit BF weight matrix $W_{Ti}$ of the i-th user so as to maximize reception power for the i-th user, determine the transmit BF weight matrix so as to maximize the signal-to-interference ratio for the i-th user, or determine the transmit BF weight matrix so as to maximize the overall channel capacity of the system.

Transmit BF weight controller 80 may generate transmit BF weight matrix $W_{Ti}$ of the i-th user using a steering vector that indicates phase and amplitude change caused by variable phase shifter PS and amplitude adjuster AA, generate the transmit BF weight matrix based on DFT (Discrete Fourier Transform) precoding, or generate the transmit BF weight matrix $W_{Ti}$ using a Butler matrix so as to orthogonalize transmission beams between a plurality of users.

In the present embodiment, receive BF weight matrix $W_{Ri}$ of the i-th user is determined as an $N_R$-by-$N_R$ unit matrix. That is, a configuration in which BF weight is not multiplied is adopted on the reception side.

1 (4)-3-1. Specific Example of Determination of Transmit BF Weight Matrices

Following is a specific exemplification of a configuration in which the transmit BF weight matrix are determined for the i-th user by using a steering vector. As described above, the transmit BF weight matrix is represented by the following equation.

$$W_{Ti} = [W_{Ti,1} W_{Ti,2} \ldots W_{Ti,L_{Ti}}]$$

Candidates for transmit BF weight vector $W_{Ti,l}$ corresponding to an l-th transmission beam are represented by the following steering vector $$w(\Phi, \theta) = \frac{1}{\sqrt{N_T}} \begin{bmatrix} \exp\{-jW_{0,0}(\Phi, \theta)\} \ldots \exp\{-jW_{N_{Tx}-1,0}(\Phi, \theta)\}, \ldots \exp \\ \{-jW_{0,N_{Tz}-1}(\Phi, \theta)\} \ldots \exp\{-jW_{N_{Tx}-1,N_{Tz}-1}(\Phi, \theta)\} \end{bmatrix}^T$$

having a $\Phi$ (horizontal angle) and a $\theta$ (vertical angle) which are variables that differ depending on the candidate. Here, $W_{n_x,n_z}(\Phi, \theta)$ in the equation is a phase rotation amount in the horizontal $n_x$-th ($n_x=0$ to $N_{Tx}-1$) and vertical $n_z$-th ($n_z=0$ to $N_{Tz}$–1) antenna elements of a uniform planar array in which a plurality of transmission antennas $A_T$ are arranged, and is represented by the following.

$$W_{n_x,n_z}(\Phi, \theta) = \frac{2\pi}{\lambda}(n_x \Delta x \cos\Phi \sin\theta + n_z \Delta z \cos\theta)$$

λ indicates the wavelength of a carrier wave.

Figure 10:
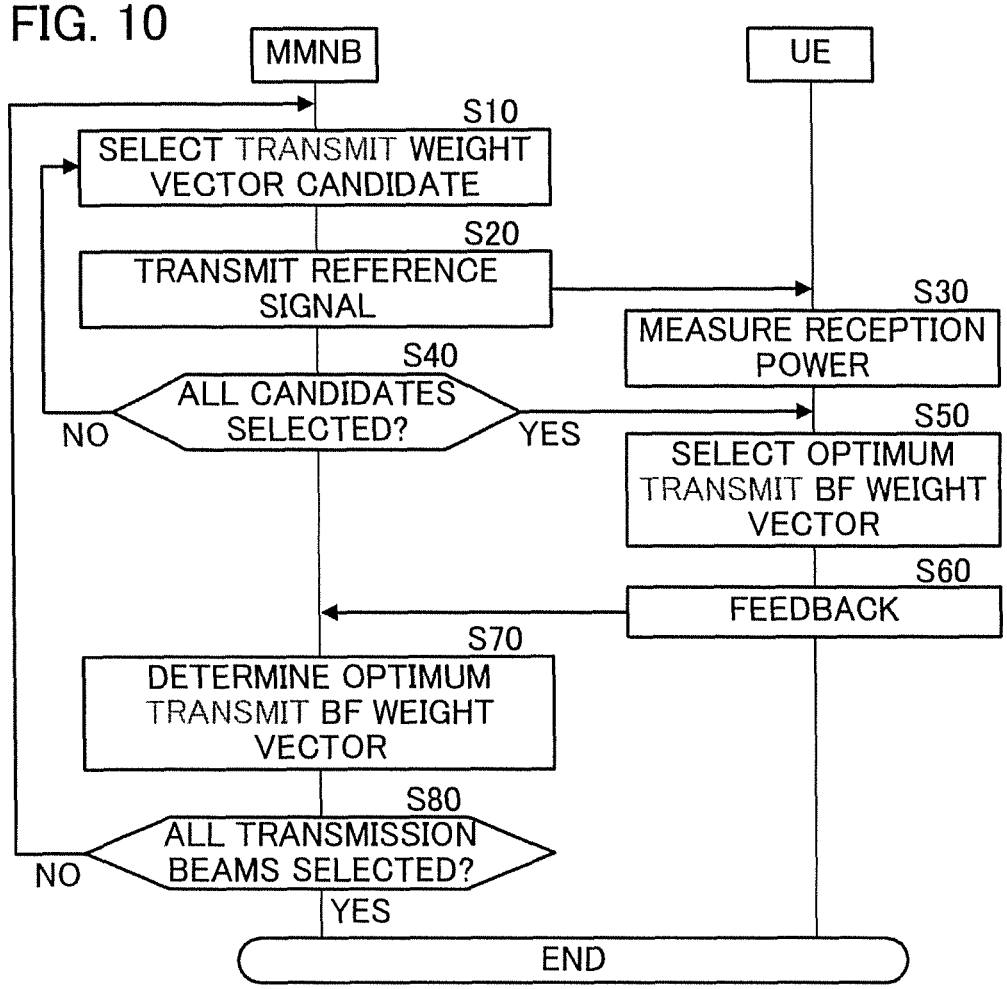
FIG. 10 shows an operational flow of the determination process of a transmit BF weight matrix in the first embodiment.

FIG. 10 shows an operational flow of the determination process for a transmit BF weight matrix. Small base station MMNB selects one transmit BF weight vector $W_{Ti,l}$ candidate (that is, a combination of Φ and θ which are steering vector variables) corresponding to the l-th transmission beam (S10), and transmits reference signals of $L_{Ti}$ number of mutually orthogonal streams (S20). User equipment UE measures the reception power of the transmitted reference signals (S30). Small base station MMNB repeats the above steps until selection of all steering vector candidates is complete (S40: NO). Transmit BF weight vector candidates (that is, combinations for Φ and θ) are preferably selected while performing shifting using predetermined difference values ΔΦ and Δθ as units.

After all steering vector candidates have been selected, small base station MMNB notifies user equipment UE of information indicating that selection is complete (S40: YES). User equipment UE selects an optimum transmit BF weight vector $W_{Ti,l}$ candidate (that is, a combination of Φ and θ) corresponding to the l-th transmission beam based on the measurement results of the reception power of the reference signals corresponding to each transmit BF weight vector candidate (S50). User equipment UE selects a transmit BF weight vector candidate having a combination of Φ and θ with which the reception power of the reference signals is maximized as the optimum transmit BF weight vector $W_{Ti,l}$. The selected optimum transmit BF weight vector is fed back to small base station MMNB from user equipment UE (S60). Small base station MMNB determines an optimum transmit BF weight vector based on the notification from user equipment UE (S70).

By the above-stated operation being repeated $L_{Ti}$ number of times (S80: NO), the $L_{Ti}$ being the number of transmission beams for the i-th user, the transmit BF weight matrix $W_{Ti}$ for the i-th user is determined.

Figure 11:
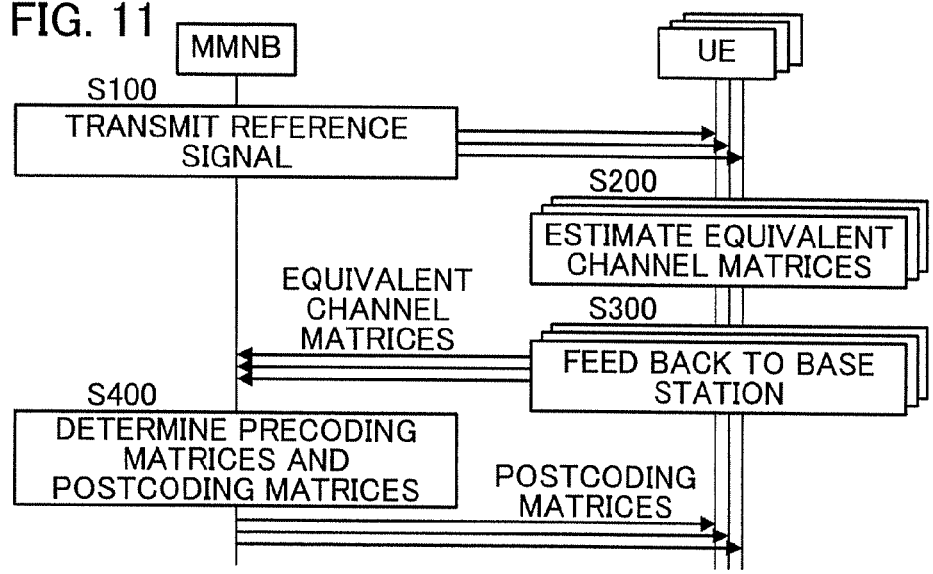
FIG. 11 shows a part of an operational flow illustrating the determination process of a precoding matrix and a postcoding matrix in the first embodiment.

1 (5). Operational Flow of the Determination Process of Precoding Matrices and Postcoding Matrices FIG. 11 shows an operational flow indicating the determination process of precoding matrices and postcoding matrices in the present embodiment. Here, in the following operational flow, it is assumed that the transmit BF weight matrix $W_{Ti}(i=1 \ldots N_U)$ and receive BF weight matrix $W_{Ri}(i=1 \ldots N_U)$ of each user have already been determined by using the aforementioned method (method disclosed in the "1 (3)-3. Determination of weight matrices" section), for example. As described above, the receive BF weight matrix $W_{Ri}$ in the present embodiment is a unit matrix.

Transmit BF weight controller 80 of small base station MMNB controls transmit beamforming unit 54 so as to subject reference signals RS to analog transmit beamforming by using the transmit BF weight matrix $W_{T1}, \ldots, W_{TN_U}$ for all users and transmit the reference signals from $N_T$ transmission antennas $A_T$ (S100).

Reference signals RS transmitted from transmission antennas $A_T$ become, by propagating through space (propagation path) towards each user equipment UE (UE-1, ..., UE-$N_U$) before reaching that user equipment UE (UE-1, ..., UE-$N_U$), reference signals RS that are multiplied by channel matrices $H_1, \ldots, H_{N_U}$ corresponding to that user equipment.

Receive BF weight controller 160 of the i-th user equipment UE-i controls receive beamforming unit 112 so as to subject reference signals RS received by reception antennas $A_R$ to analog receive beamforming using receive BF weight matrix $W_{Ri}$, which is a unit matrix (that is, so as not to multiply by reception weight)

The reference signals RS received by receive beamforming unit 112 are input to transmission/reception characteristic estimator 150 via down-converter 114 and AD converter 120. Transmission/reception characteristic estimator 150 estimates equivalent channel matrices $H_{i,1}, \ldots, H_{i,j}, \ldots, H_{i,N_U}(=H_i W_{T1}, \ldots, H_i W_{Tj}, \ldots, H_i W_{TN_U})$ using the input reference signals RS (S200). The above channel matrices are characteristic matrices indicating signal change caused by transmit beamforming and spatial propagation. The above-stated equivalent channel matrix estimation is carried out in the same way as conventional channel estimation. For example, channel matrix estimation using the least squares method can be adopted. The estimated equivalent channel matrices are fed back from the i-th user equipment UE-i via feedback unit 180 (S300), and received by small base station MMNB.

As a result of all user equipments UE (UE-1, ..., UE-$N_U$) carrying out the above-stated steps S200 and S300, small base station MMNB acquires a combination of all equivalent channel matrices, $$\begin{bmatrix} H_{1,1} & \cdots & H_{1,N_U} \\ \vdots & \ddots & \vdots \\ H_{N_U,1} & \cdots & H_{N_U,N_U} \end{bmatrix} = \begin{bmatrix} H_1 W_{T1} & \cdots & H_1 W_{TN_U} \\ \vdots & \ddots & \vdots \\ H_{N_U} W_{T1} & \cdots & H_{N_U} W_{TN_U} \end{bmatrix}.$$

Precoding controller 70 of small base station MMNB generates excluding channel matrices $\tilde{H}'_1, \ldots, \tilde{H}'_i, \ldots, \tilde{H}'_{N_U}$ for all users by using all of the acquired combinations of equivalent channel) matrices, and determines $N_U$ precoding matrices $P_i$ (i=1 ... $N_U$) and $N_U$ postcoding matrices $B_i$ (i=1 ... $N_U$) according to the aforementioned method (method explained in the "1 (3)-2. Calculation of precoding matrices for achieving block diagonalization" section) (S400).

In the present example, determination of precoding matrices and postcoding matrices is carried out in small base station MMNB (precoding controller 70). Each of the determined postcoding matrices is notified to a corresponding user equipment UE via feedback unit 60.

1 (6). Effects of the Present Embodiment

According to the above-stated configuration of the present embodiment, in a MU-MIMO environment in which fixed beamforming is adopted, by using a precoding matrix $P_i$ (i=1 ... $N_U$) determined based on excluding channel matrices $\tilde{H}'_i = [(H_{1,i})^T, \ldots, (H_{i-1,i})^T, (H_{i+1,i})^T, \ldots, (H_{N_U,i})^T]^T$, a matrix $$\begin{bmatrix} H_1 W_{T1} & \cdots & H_1 W_{TN_U} \\ \vdots & \ddots & \vdots \\ H_{N_U} W_{T1} & \cdots & H_{N_U} W_{TN_U} \end{bmatrix}$$

having equivalent channel matrices corresponding to all users (UE-1, ..., UE-$N_U$) as components is block-diagonalized (non-diagonal components corresponding to interference components become zero), the excluding channel matrices being a set of equivalent channel matrices $H_k W_{Ti} = H_{k,i}$ ($k \neq i$) in which transmit BF weight matrix $W_{Ti}$ for the i-th user is multiplied by each of the channel matrices $H_1, \ldots, H_{i-1}, H_{i+1}, \ldots, H_{N_U}$ of users other than the i-th user. As a result, interference control is achieved between MU-MIMO users.

2. Second Embodiment

A second embodiment of the present invention is described below. In each of the embodiments exemplified below, for elements for which effects and functions are the same as those of the first embodiment, the same reference signs are used and explanation of each of the elements is omitted, as appropriate.

In a transmitter (small base station MMNB), the greater the number $L_T$ of transmission beams is, the greater the increase in circuitry size (number of processing circuitry $PC_T$) is, resulting in increased manufacturing costs. Accordingly, to reduce the manufacturing costs of small base station MMNB, the number $L_T$ of transmission beams should be reduced.

As described above, to achieve interference control by block diagonalization such as that in the first embodiment, it is necessary for the number $L_{Ti}$ of transmission beams used by each user (i-th user) to be at least the number $N_R \cdot N_U$ of reception antennas $A_R$ of the entire system ($L_{Ti} \geq N_R \cdot N_U$). Therefore, to reduce the number $L_{Ti}$ of transmission beams, the number $N_R$ of reception antennas for each user and/or the total number $N_U$ of users compatible with MU-MIMO should be reduced.

Meanwhile, if the number $L_{Ti}$ of transmission beams is reduced, the number of columns ($N_R$-by-$L_{Ti}$) of equivalent channel matrix $$H_k W_{Ti} = H_{k,i}$$

is reduced, thereby reducing the degree of freedom. As a result, it is possible that transmission characteristics deteriorate due to the inability to sufficiently reduce inter-user interference. Accordingly, the reduction of degree of freedom that accompanies the reduction of the number $L_{Ti}$ of transmission beams should be compensated for.

2 (1). Virtual Reduction of the Number of Reception Antennas

In the first embodiment, block diagonalization is carried out by using an $N_R$-by-$L_{Ti}$ equivalent channel matrix $H_{k,i} = H_k W_{Ti}$. In the present embodiment, the number $N_R$ of reception antennas for each user is virtually reduced by carrying out block diagonalization by using, as an equivalent channel matrix, an $L_{Rk}$-by-$L_{Ti}$ (where $N_R > L_{Rk}$) matrix $$H_{k,i} = W_{Rk} H_k W_{Ti}$$

that includes a receive BF weight matrix in place of the above-stated matter.

The specific flow of calculation in block diagonalization is the same as the flow in the first embodiment apart from the replacement of the equivalent channel matrix as described above. That is, a set of ($L_{Rk} \cdot (N_U - 1)$)-by-$L_{Ti}$ equivalent channel matrices (excluding channel matrices) is defined as $$\tilde{H}'_i = [(H_{1,i})^T, \ldots, (H_{i-1,i})^T (H_{i+1,i})^T, \ldots, (H_{N_U,i})^T]^T,$$

a two-stage single value decomposition is carried out in the same way as that in the first embodiment, and precoding matrix $P_i$ and postcoding matrix $B_i$ are calculated. Since the specific calculation method is explained in the first embodiment, explanation thereof is omitted.

In the present embodiment, since the size (number of rows) of the equivalent channel matrix $H_{k,i}$ is reduced from $N_R$-by-$L_{Ti}$ to $L_{Rk}$-by-$L_{Ti}$ compared to the first embodiment (that is, the number $N_R$ of reception antennas $A_R$ is virtually reduced), the minimum required number $L_{Ti}$ of transmission beams used by each user (i-th user) falls from $N_R \cdot N_U$ to $L_{Rk} \cdot N_U$ (where $L_{Ti} \geq L_{Rk} \cdot N_U$). That is, a drop in the rank of the equivalent channel matrix improves the degree of freedom.

In the foregoing, $L_{Rk}$-by-$N_R$ receive BF weight matrix $W_{Rk}$ corresponding to users other than the i-th user may be generated by selecting $L_{Rk}$ reception beams in decreasing order of reception power, for example. That is, in user equipment UE, the above-stated receive BF weight matrix may be generated by generating $N_R$ number of orthogonal beams in time division by using $L_R$ number of receive beamformers, and selecting $L_{Rk}$ number of reception beams in decreasing order of reception power from among the orthogonal beams.

In place of the foregoing, the receive BF weight matrix may be generated by selecting reception antennas $A_R$ in which the reception power is likely to be high. That is, a receive BF weight matrix in which $L_{Rk}$ number of reception antennas $A_R$ are selected in decreasing order of reception power may be generated based on the received signal vector $$r_i = H_i W_{Ti} P_i s_i + z_i$$

of the i-th user.

The receive BF weight matrix may also be generated based on the MMSE (Minimum Mean Square Error) method, for example, so as to maximize the capacity $$C = \log \det(I + B_i W_{Ri} H_i W_{Ti} P_i P_i^H W_{Ti}^H H_i^H W_{Ri}^H B_i^H),$$

which is determined based on $W_{Rk} H_k W_{Ti}$.

2 (2). Effects of the Present Embodiment

According to the configuration described above, the number $N_R$ of reception antennas of each user equipment UE is virtually reduced, thereby reducing the number $L_{Ti}$ of transmission beams for each user, making it possible to reduce the overall number $L_T$ of transmission beams. As a result, the circuitry size of small base station MMNB can be kept small, thereby reducing manufacturing costs. In addition, due to the rank of the equivalent channel matrix being lowered, the degree of freedom can be improved.

3. Third Embodiment

In the second embodiment, the number $L_T$ of transmission beams is reduced by virtually reducing the number $N_R$ of reception antennas with respect to each user. In the third embodiment, the number $L_T$ of transmission beams is reduced by reducing the total number $N_U$ of users for whom MU-MIMO is to be used.

3 (1). Reduction in the Number of User Equipments Subject to Orthogonalization

The total number $N_U$ of users that are to perform MU-MIMO communication (that is, subject to orthogonalization) is reduced. More specifically, only the number of users that can be orthogonalized with the i-th user are classified as subject to orthogonalization based on the degree of freedom of equivalent channel matrix $H_{k,i}$ after the number $L_{Ti}$ of transmission beams has been reduced, and the other users are classified as not subject to orthogonalization with the i-th user. For users classified as not subject to orthogonalization, interference from the i-th user is not eliminated (that is, interference from the i-th user is permitted).

In the first embodiment, when generating excluding channel matrices $\hat{H}'_i$ for the i-th user, only the equivalent channel matrix $H_{i,i}$ including a channel matrix corresponding to the i-th user is excluded, but in the present example, an equivalent channel matrix $H_{m,i}$ including a channel matrix corresponding to a user classified as not subject to orthogonalization with the i-th user (m-th user) is further excluded to calculate a precoding matrix $P_i$. A plurality of m-th users classified as not being subject to orthogonalization with the i-th user may exist.

Selection of user(s) subject to orthogonalization (in turn, selection of users not subject to orthogonalization) is carried out subsequent to feedback of an equivalent channel matrix from user equipment UE (S300), and prior to determination of a precoding matrix (S400).

Figure 12:
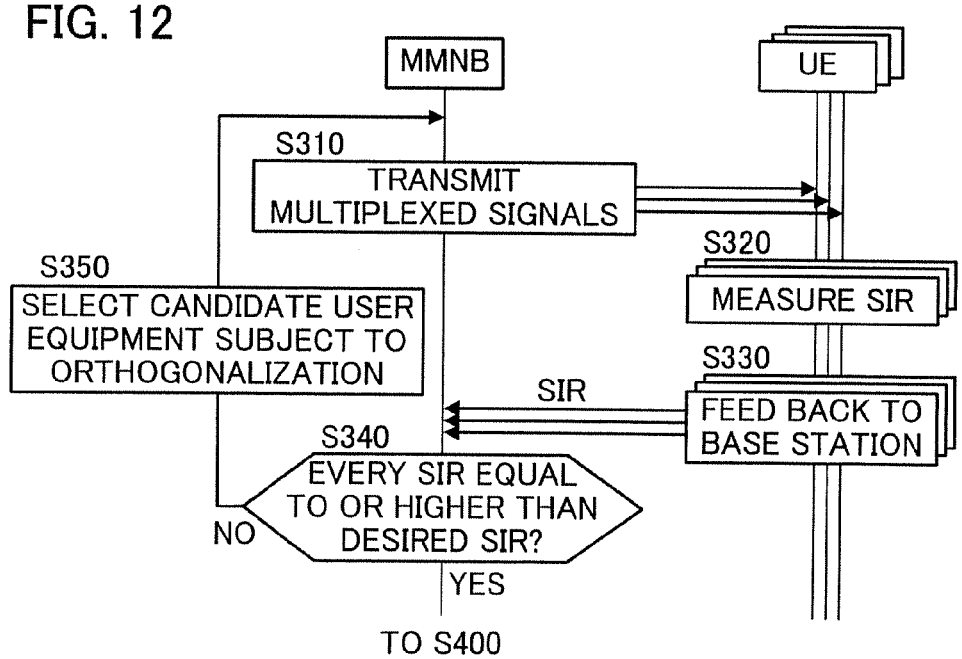
FIG. 12 shows an example of an operational flow illustrating the selection process of users subject to orthogonalization in a third embodiment.

FIG. 12 shows an example of an operational flow indicating the selection process of users subject to orthogonalization. In the present example, users subject to orthogonalization are selected in ascending order of signal-to-interference ratio (SIR) based on the SIR measured in each user equipment UE. Small base station MMNB multiplexes and transmits signals addressed to a plurality of user equipments UE that can be subject to orthogonalization (S310). Each user equipment UE receives the signal transmitted from small base station MMNB and measures the SIR (S320), and feeds back to small base station MMNB (S330). Small base station MMNB determines whether or not each SIR fed back from the plurality of user equipments UE is equal to or higher than a desired SIR (S340).

If all of the SIRs fed back are equal to or higher than the desired SIR (S340: YES), small base station MMNB advances to determination of a precoding matrix (S400) without selecting the user equipments that have notified these SIRs as being subject to orthogonalization. Meanwhile, if an SIR that is lower than the desired SIR is included in the SIRs that have been fed back (S340: NO), small base station MMNB selects, in ascending order of SIR, user equipments UE as being subject to orthogonalization, and repeats the above-stated loop (steps S310 to S340). As described above, the upper limit of the number of user equipments UE to be selected is determined according to the degree of freedom of equivalent channel matrices corresponding to the number $L_{Ti}$ of transmission beams.

Figure 13:
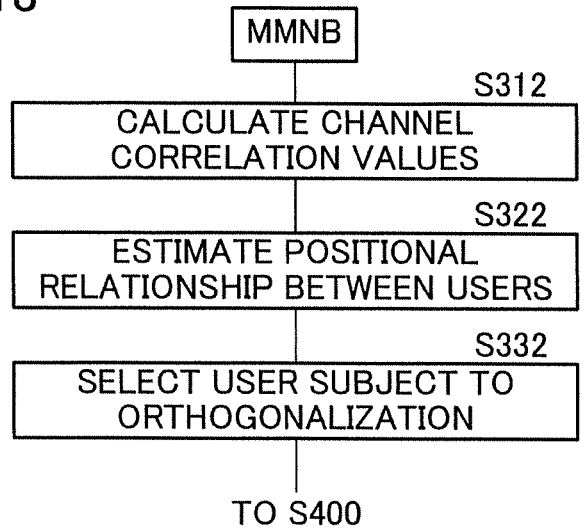
FIG. 13 shows an example of an operational flow illustrating the selection process of users subject to orthogonalization in the third embodiment.

FIG. 13 shows another example of the operational flow illustrating the selection process for users subject to orthogonalization. In the present example, users subject to orthogonalization are selected based on channel correlation between users. Small base station MMNB calculates channel correlation values between all user equipments UE based on the equivalent channel matrix fed back from each user equipment UE (S312). Small base station MMNB estimates the positional relationship between all user equipments UE based on the calculated channel correlation values (S322). It can be estimated that the higher the channel correlation value between two user equipments UE is, the closer those user equipments UE are to each other.

Small base station MMNB calculates the total of the channel correlation values for each user equipment UE, and selects user equipments subject to orthogonalization in decreasing order of the total value (S332). This is because it is possible to infer that the greater the total value of the channel correlation values in a certain user equipment UE, the larger the number of other user equipments UE present in the proximity of that user equipment UE (that is, the SIR of that user equipment UE is lower) is.

3 (2). Effects of the Present Embodiment

According to the above-stated configuration, since the total number $N_U$ of users subject to MU-MIMO (that is, subject to orthogonalization) is reduced, it is possible to reduce the number $L_{Ti}$ of transmission beams for each user and thereby reduce the overall number $L_T$ of transmission beams. As a result, the circuitry size of small base station MMNB can be kept small, and manufacturing costs can be reduced.

4. Fourth Embodiment

In the fourth embodiment, interference to users other than the i-th user is suppressed by further adjusting transmit BF weight matrix $W_{Ti}$ of the i-th user determined as described in section "1 (4)-3" of the first embodiment, for example.

4 (1). Adjustment of Transmit BF Weight Matrices

Figure 14:
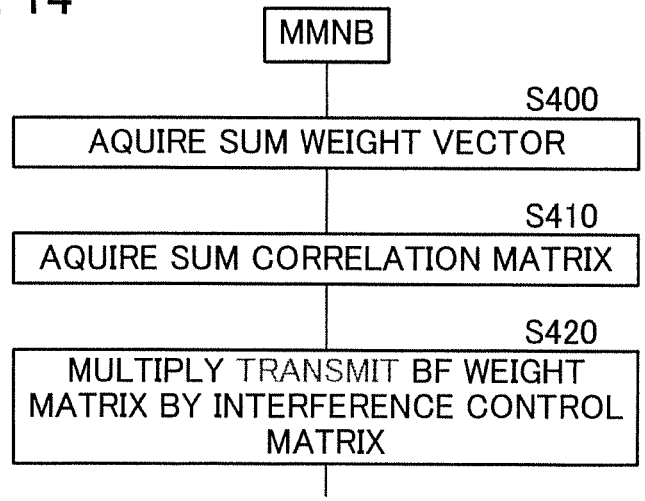
FIG. 14 shows an example of an operational flow illustrating the adjustment process of a transmit BF weight matrix in a fourth embodiment.

FIG. 14 shows an example of an operational flow indicating the adjustment process of a transmit BF weight matrix. Transmit BF weight controller 80 of small base station MMNB calculates the total of $N_T$-by-1 transmit BF weight vectors corresponding to the l-th transmission beams for users other than the i-th user (plurality of k-th users) as indicated in the following equation (S400).

$$w_{sum,Ti,l} = \sum_{k=1, k \neq i}^{N_U} w_{Tk,l}$$

As a result of step S400, the $L_{Tk}$ (number of transmission beams) number of sum weight vectors $$w_{sum,Ti,l}(l=1 \ldots L_{Tk})$$

is obtained.

Next, transmit BF weight controller 80 calculates a correlation matrix $$w_{sum,Ti,l} w_{sum,Ti,l}^H$$

each of the acquired sum weight vectors, and calculates the sum with respect to all transmission beams as indicated in the following equation (S410).

$$W_{sum,Ti,l} = \sum_{l=1}^{L_{Tk}} w_{sum,Ti,l} w_{sum,Ti,l}^H$$

As a result of step S410, an $N_T$-by-$N_T$ sum correlation matrix $W_{sum,Ti}$ is obtained.

Transmit BF weight controller 80 acquires an adjusted transmit BF weight matrix $$W'_{Ti} = W_{sum,Ti}^{-1} W_{Ti}$$

by multiplying transmit BF weight matrix $W_{Ti}$ by an inverse matrix (interference control matrix) $W_{sum,Ti}^{-1}$ of the acquired sum correlation matrix by (S420).

The above-stated steps S400 to S420 are carried out with respect to all users $(1, \ldots, N_U)$, and the transmit BF weight matrix is adjusted for each of all users. The adjusted transmit BF weight matrix acquired as described above is used in transmission of radio signals from small base station MMNB.

4 (2). Effects of the Present Embodiment

According to the above configuration, since interference control matrices generated based on transmit BF weight vectors corresponding to transmission beams for users other than the i-th user is multiplied by the transmit BF weight matrix of the i-th user, it is possible to reduce interference from radio signals for the i-th user to other users.

5. Modifications

The above embodiment may be modified in various ways. Specific modes of modification are exemplified below. Two or more modes selected from among the embodiments described above and the below exemplifications may be combined, as appropriate, provided the modes do not contradict one another.

5 (1). First Modification

In the embodiments described above, the number $L_{Ti}$ of transmission beams of a certain user (i-th user) is set in a fixed manner (for example, $L_{Ti}=L_T/N_U$). However, the number $L_{Ti}$ of transmission beams may be set in a dynamic manner. For example, the number $L_{Ti}$ of transmission beams may be set such that the communication speed of an i-th user is equal to or higher than a fixed value, may be set such that the overall communication speed of the system is further improved (preferably maximized), may be set such that the communication speed is improved compared to when the number $L_{Ti}$ of transmission beams is set in a fixed manner, or may be set so as to increase the capacity of the i-th user (preferably maximize). For example, the number $L_{Ti}$ of transmission beams is preferably set according to an MCS (Modulation and Coding Scheme) value.

According to the above-stated configuration, it is possible to accommodate differences in quality required for each user in a flexible manner. It is also possible to improve the overall communication speed of the system, while ensuring equality of communication speed between users.

5 (2). Second Modification

In the embodiments described above, communication of control information between small base station MMNB and user equipment UE can be carried out on a route of choice. For example, when a radio link is established between small base station MMNB and user equipment UE, control information may be exchanged by directly transmitting/receiving radio signals. If the above-stated radio link is not established, small base station MMNB and user equipment UE may transmit/receive control information via macro base station MeNB.

5 (3). Third Modification

In the embodiments described above, precoding matrices and postcoding matrices are determined on the transmission side (small base station MMNB). However, determination of coding matrices may be carried out in locations of choice within radio communication system 1. For example, postcoding matrices may be determined on the reception side (user equipment UE). Postcoding matrices may be determined on the transmission side, and precoding matrices may be determined on the reception side. Precoding matrices and/or postcoding matrices may be determined in locations that are not on the transmission side or the reception side (for example, central control station MME).

5 (4). Fourth Modification

In the embodiments described above, small base station MMNB determines precoding matrices and the like based on equivalent channels fed back from user equipments UE. When time division duplex (TDD) is adopted in radio communication system 1, the same frequency is used for the uplink and downlink, thus small base station MMNB can estimate equivalent channels based on reference signals transmitted from user equipment UE and determine precoding matrices and the like. That is, when time division duplex is adopted, equivalent channels do not need to be fed back from user equipments UE to small base station MMNB.

5 (5). Fifth Modification

Transmit beamforming unit 54 of small base station MMNB may have a full-array configuration in which one transmission beam is generated using all the $N_T$ transmission antennas $A_T$, or a sub-array configuration in which one transmission beam is generated using $(N_T/L_T)$ number of transmission antennas $A_T$. Either configuration enables the user multiplexing in the embodiments described above.

5 (6). Sixth Modification

Various types of characteristic improvement methods can be further applied to users that have been subjected to block diagonalization in the embodiments described above. For example, the following method may be applied: adaptive modulation and coding (AMC), which adaptively change correction coding scheme or modulation scheme; rank adaptation, which adaptively controls the number of transmission streams; or power distribution.

5 (7). Seventh Modification

A user equipment UE is a device of choice that is capable of radio communication with a base station (for example, macro base station MeNB, small base station MMNB) within a network. A user equipment UE maybe a mobile telephone terminal such as a feature phone or a smartphone, a tablet terminal, a desktop PC, a notebook PC, an ultra-mobile personal computer (UMPC), a portable gaming device, or some other type of radio terminal, for example.

5 (8). Eighth Modification

Each of the functions carried out by the CPU in each of the elements (user equipment UE and small base station MMNB) within radio communication system 1 may be carried out by hardware in place of a CPU, or may be carried out by a programmable logic device such as a field programmable gate array (FPGA) or a digital signal processor (DSP), for example.

DESCRIPTION OF THE REFERENCE SIGNS

1 . . . radio communication system; MMNB . . . small base station; 10 . . . data signal generator; 20 . . . reference signal generator; 30 . . . baseband processor; 32 . . . precoding unit; 40 . . . converter; 50 . . . processor; 52 . . . up-converter; 54 . . . transmit beamforming unit; 60 . . . feedback unit; 70 . . . precoding controller; 80 . . . weight controller;

90 . . . storage unit; UE . . . user equipment; 110 . . . processor; 112 . . . receive beamforming unit; 114 . . . down-converter; 120 . . . converter; 130 . . . baseband processor; 132 . . . postcoding unit; 140 . . . signal analyzer; 150 . . . transmission/reception characteristic estimator; 160 . . . weight controller; 170 . . . postcoding controller; 180 . . . feedback unit; 190 . . . storage unit; AA . . . amplitude adjuster; $AC_R$ . . . analog signal processing circuitry; $AC_T$ . . . analog signal processing circuitry; AD . . . adder; $A_R$ . . . reception antenna; $A_T$ . . . transmission antenna; Cm . . . macro cell; Cmm . . . Massive-MIMO cell; $DC_R$ . . . digital signal processing circuitry; $DC_T$ . . . digital signal processing circuitry; MME . . . central control station; MP . . . multiplier; MeNB . . . macro base station; $PC_R$ . . . processing circuitry; $PC_T$ . . . processing circuitry; PS . . . variable phase shifter.

The invention claimed is:

1. A communication control method in a radio communication system that includes a transmitter and a plurality of receivers that carry out radio communication using an MU-MIMO communication scheme, the method comprising:

for each of plurality of receivers, among the plurality of receivers, that are to perform MU-MIMO communication with the transmitter, calculating excluding channel matrices that include a plurality of equivalent channel matrices acquired by multiplying a transmit BF (beamforming) weight matrix corresponding to that receiver by each of a plurality of channel matrices corresponding to receivers other than that receiver, acquiring a first eigenvector that is included in a right-singular matrix obtained from single value decomposition of the excluding channel matrices, the first eigenvector corresponding to a noise subspace of the excluding channel matrices, acquiring a second eigenvector that is included in a right-singular matrix obtained from single value decomposition of a product of an equivalent channel matrix including the transmit BF weight matrix corresponding to that receiver and the first eigenvector, the second eigenvector corresponding to a signal subspace of the product, and obtaining a precoding matrix corresponding to that receiver by multiplying the first eigenvector by the second eigenvector.

2. The communication control method set forth in claim 1, wherein the excluding channel matrices includes a plurality of equivalent channel matrices that are obtained by multiplying the transmit BF weight matrix corresponding to that receiver by a plurality of channel matrices corresponding to receivers other than that receiver and a plurality of receive BF weight matrices corresponding to the receivers other than that receiver.

3. The communication control method set forth in claim 1, wherein the transmit BF weight matrix corresponding to that receiver includes a plurality of transmission weight vectors, and wherein each of the plurality of transmission weight vectors is a steering vector having a combination of a horizontal angle and a vertical angle for maximizing reception power in that receiver.

4. The communication control method set forth in claim 1, wherein the plurality of receivers that are to perform MU-MIMO communication with the transmitter are selected in ascending order of a signal-to-interference ratio.

5. The communication control method set forth in claim 1, wherein the transmit BF weight matrix corresponding to that receiver is multiplied by an interference control matrix, the interference control matrix being an inverse matrix of a sum correlation matrix that is obtained by calculating a sum of correlation matrices, the correlation matrices being calculated for respective sum weight vectors, the sum weight vectors being obtained by calculating, for each transmission beam, a sum of a plurality of transmit BF weight vectors corresponding to receivers other than that receiver.

6. A radio communication system that includes a transmitter and a plurality of receivers that carry out radio communication using an MU-MIMO communication scheme, the radio communication system comprising a precoding controller configured to:

for each of plurality of receivers, among the plurality of receivers, that are to perform MU-MIMO communication with the transmitter, calculate excluding channel matrices that include a plurality of equivalent channel matrices acquired by multiplying a transmit BF weight matrix corresponding to that receiver by each of a plurality of channel matrices corresponding to receivers other than that receiver;

acquire a first eigenvector that is included in a right-singular matrix obtained from single value decomposition of the excluding channel matrices, the first eigenvector corresponding to a noise subspace of the excluding channel matrices;

acquire a second eigenvector that is included in a right-singular matrix obtained from single value decomposition of a product of an equivalent channel matrix including the transmit BF weight matrix corresponding to that receiver and the first eigenvector, the second eigenvector corresponding to a signal subspace of the product; and obtain a precoding matrix corresponding to that receiver by multiplying the first eigenvector by the second eigenvector.

7. A transmitter that carries out radio communication with a plurality of receivers by using an MU-MIMO communication scheme, the transmitter comprising a precoding controller configured to:

for each of plurality of receivers, among the plurality of receivers, that are to perform MU-MIMO communication with the transmitter, calculate excluding channel matrices that include a plurality of equivalent channel matrices acquired by multiplying a transmit BF weight matrix corresponding to that receiver by each of a plurality of channel matrices corresponding to receivers other than that receiver;

acquire a first eigenvector that is included in a right-singular matrix obtained from single value decomposition of the excluding channel matrices, the first eigenvector corresponding to a noise subspace of the excluding channel matrices;

acquire a second eigenvector that is included in a right-singular matrix obtained from single value decomposition of a product of an equivalent channel matrix including the transmit BF weight matrix corresponding to that receiver and the first eigenvector, the second eigenvector corresponding to a signal subspace of the product; and obtain a precoding matrix corresponding to that receiver by multiplying the first eigenvector by the second eigenvector.

* * * * *